US006859856B2

(12) United States Patent
Piau et al.

(10) Patent No.: US 6,859,856 B2
(45) Date of Patent: Feb. 22, 2005

(54) METHOD AND SYSTEM FOR A COMPACT FLASH MEMORY CONTROLLER

(75) Inventors: Fong Piau, Penang (MY); Ong Chun Huat, Penang (MY)

(73) Assignee: Flex P Industries SDN. BHD, Penang (MY)

( * ) Notice: Subject to any disclaimer, the term of this patent is extended or adjusted under 35 U.S.C. 154(b) by 193 days.

(21) Appl. No.: 10/045,592

(22) Filed: Oct. 23, 2001

(65) Prior Publication Data

US 2003/0079077 A1 Apr. 24, 2003

(51) Int. Cl.⁷ .............................................. G06F 13/00
(52) U.S. Cl. .................. 711/103; 711/170; 710/10; 710/11; 710/14; 713/1; 365/185.33
(58) Field of Search .................. 711/100–101, 103, 711/5, 170, 166, 115; 713/1–2, 100; 710/8, 10, 11, 13, 14, 5, 104–105, 301, 305, 310; 365/189.02, 189.05, 185.33, 185.11, 226, 63

(56) References Cited

U.S. PATENT DOCUMENTS

| | | | | |
|---|---|---|---|---|
| 5,812,814 A | * | 9/1998 | Sukegawa | 711/103 |
| 6,032,237 A | * | 2/2000 | Inoue et al. | 711/163 |
| 6,145,069 A | * | 11/2000 | Dye | 711/170 |
| 6,182,162 B1 | * | 1/2001 | Estakhri et al. | 710/11 |
| 6,385,667 B1 | * | 5/2002 | Estakhri et al. | 710/8 |
| 6,418,501 B1 | * | 7/2002 | Gama et al. | 710/305 |
| 6,438,638 B1 | * | 8/2002 | Jones et al. | 710/301 |
| 2003/0067814 A1 | * | 4/2003 | Piau et al. | 365/189.05 |

* cited by examiner

Primary Examiner—Denise Tran
(74) Attorney, Agent, or Firm—Peninsula IP Group; Douglas A. Chaikin

(57) ABSTRACT

Disclosed herein is a flash memory controller that is incorporated in a flash memory. The flash memory controller allows the memory card to operate in either the PCMCIA mode, or true IDE mode. The method and system for the controller is adapted to selectively recall the data from the flash memory and transmit the data to one or more recipient devices via the PCMCIA type interface, or the true IDE interface, or by an alternate interface. The method and system, when manipulated by the host device, induces the controller to send the data via the PCMCIA type interface, or the true IDE interface. In another embodiment, an alternate allows data stored in the flash memory to be transmitted via a number of specified input devices.

25 Claims, 11 Drawing Sheets

METHOD AND SYSTEM FOR A COMPACT FLASH MEMORY CONTROLLER

BACKGROUND OF THE INVENTION

1. Field of the Invention

The present invention is generally related to flash memory systems. More particularly, the invention relates to a compact flash controller that manages a set of compact flash memory modules used as a storage device, and/or an external memory device having a flash memory as a storage medium.

2. Description of the Related Art

Many of the smaller electronic devices and systems such as digital cameras, MPEG portable music system, and personal data assistants are now being configured with memory designed to store both data and applications content captured by these devices. One advantage of having memory in such devices is that the captured data or application content can be eventually downloaded to a host system at a subsequent time. For example, a digital camera captures an array of images and stores them in memory to be downloaded to an image or graphics application program running on a computer system that coverts the captured images into high-resolution photographs that can be incorporated in newspaper and magazine articles or a presentation.

Typically, these devices employ a non-volatile, readable/writable storage device that requires very little, if any, power to retain its content. This solid state or semiconductor data storage system, commonly referred as a flash memory is a card that incorporates a controller, plurality of flash memory modules or arrays, and a PCMCIA interface that provides the required connectivity to an electronic device or system. Each module includes a number of flash memory cells that are organized in a set of independently erasable blocks. The controller performs the fundamental operation of read, write, and block erase to stores either data or application content in one or more memory locations and then recalls the stored data or application content, upon request, for output to an external device or system. Unlike other forms of memory or mass storage, the amount of time necessary to perform a write data or program bit and erase can be significant. Nevertheless, for a number of applications, the advantages of low power, ruggedness, portability and smaller size of a flash memory system makes it a reasonable alternative to other data storage devices.

FIG. 1 is a block diagram illustrating a typical flash memory controller as implemented in the prior art. FIG. 1 shows that the flash memory controller 104 comprises a host interface 110 that includes a host multiplexer 116, a buffer manager 112 that has a buffer multiplexer 118, and a flash memory formatter 114 comprising a flash memory sequencer 120 and an ECC process circuit 122 to perform error correction. The host interface 110 transfers data, commands and or application content to and from the host computer 102. The host multiplexer 116 operates on time division basis to convert the received data, commands or application content in a sixteen bit format into an eight bit format prior to it being stored in one or more flash memory arrays 108. In addition, the host multiplexer 116 converts the data, commands or application content retrieved from flash memory 108 into a sixteen bit data stream so it can be transmitted back to the host computer 102 for processing.

As shown by FIG. 1, the flash memory controller 104 uses an external buffer 106 to execute all of the read/write operations between the host system 102 and the flash memory 108. Thus, when data is to be written to flash memory 108, the data, commands or application content received from the host computer 102 is converted from a sixteen bit to a eight bit data stream by the host interface 110 and is then placed in the external data buffer 106 by the buffer memory manager 112. Once stored in the buffer 106, the data is directed through the buffer memory multiplexer 118 of the buffer manager 112 to the flash memory formatter 114. The flash memory sequencer 120 controls an access process of writing to and or reading from one or more sectors of the flash memory 108. Under program control, the flash memory sequencer 120 transfers data or application content, via an eight-bit bus, to and from one or more sectors of the flash memory 108. As described above, all data movement or transfer functions between the host system 102 and the flash memory 108 must pass through the buffer multiplexer 118 and external buffer 106. This is due to the fact that the transfer rate of flash memory 108 is much slower than that of host computer 102. In other words, in order to perform either a write to, read from, or erase the contents function, the eight bit bus 124 between the flash memory controller 104 and flash memory 108 is occupied for a substantial period of time. Here, the external buffer 106 is used to equalize the differences in the transfer rate between the host system 102 and flash memory 108 by allowing data or application content to be transmitted to and received from host computer 102 more efficiently.

The problem with this approach is that it takes twice as long to transfer data or applications content in or out of flash memory 108 when all data transfer functions must be passed through the buffer manager 112 as well as in and out of the external buffer 106. By using an external buffer each and every time to perform a write cycle or read cycle via the buffer, it reduces the overall performance of the flash memory controller. In addition, a flash memory controller of this type is limited to transmitting the stored commands, data or application content through a single input-output interface. As a result, electronic devices that incorporate such a mechanism are only able to download data to external sources through the host interface. Hence, an external source such as a digital camera, MPEG portable player, or personal data assistant that receives the stored data and or application content via a flash memory system with this type of controller has to have the same or similar interface to receive the data from the memory.

Hence, there is a need for a compact flash memory controller that can be constructed at a cost comparable to that of currently available flash memory modules. In addition, the needed compact flash memory controller should incorporate and support other capabilities in a manner that would allow for simple transmission of data stored in the flash memory via one or more industry standard I/O interfaces. The needed compact flash controller should utilize interface to a variety of different devices in a variety of configurations such as a PCMCIA-ATA and IDE modes. Each of these modes of operation requires different protocols. Upon initialization with an interface device, this needed compact flash controller should automatically detect which operation mode is used by this interface device and configure the memory card to be compatible with its operation.

SUMMARY OF INVENTION

An object of the present invention is to provide a new and improved compact flash memory controller by overcoming at least some of the disadvantages and limitations of flash memory controller as implemented in the prior art.

It is also an object of the present invention to provide a compact flash controller that provides a means for writing to and reading data from a plurality of flash memory modules with improved throughput characteristics.

The above and other objects are attained by a compact flash memory controller in accordance with this invention controlling the transfer of data between flash memory and a host device performed by a compact flash controller comprising the steps of receiving power up sequence from the host device; detecting presence of a card containing a plurality of flesh memory components; initializing the controller, a plurality of flash memory modules as well as other internal components; receiving an incoming OE/ATSEL or request for a PCMCIA-ATA or an IDE specification signal; determining which interface specification is to be used for to transfer data, address information and control signals to and from the host device; configuring structure of the flash memory in accordance to the parameters of the configuration information table stored in a read-only memory of the compact flash controller; detecting that there is a command to be processed; selecting the command specified by a plurality of command parameters from at least one register found in an attribute memory of the compact flash controller; and executing the command.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

The present invention now will be described more fully with reference to the accompanying drawings, in which the preferred embodiments of the invention are shown. The present invention may, however, be embodied in many different forms and should not be construed as limited to the embodiment set forth herein; rather these embodiments are provided so that this disclosure will be thorough and complete and will fully convey the invention to those skilled in the art.

Figure 1:
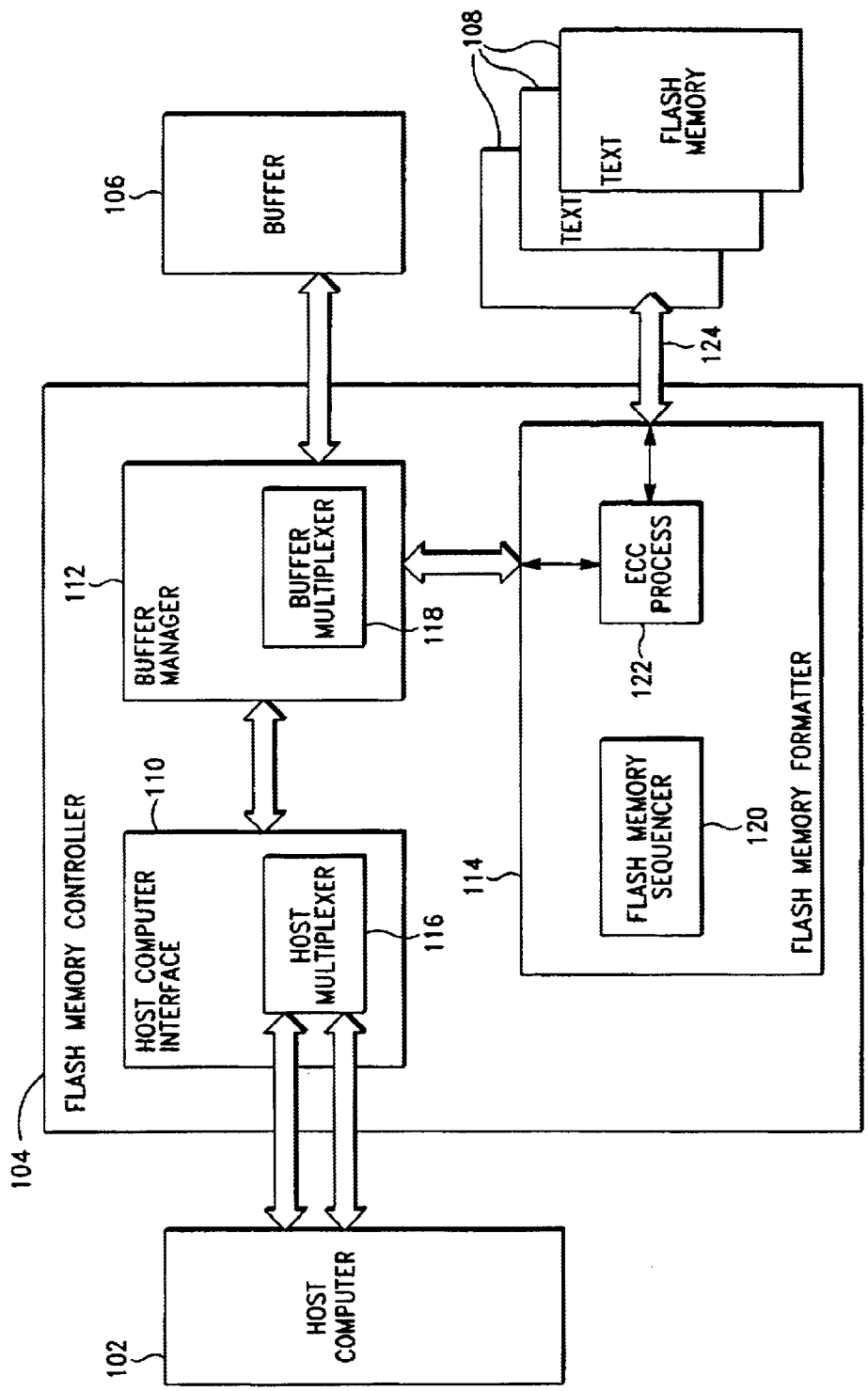
FIG. 1 is a block diagram illustrating a typical flash memory controller as implemented in the prior art.
Figure 2:
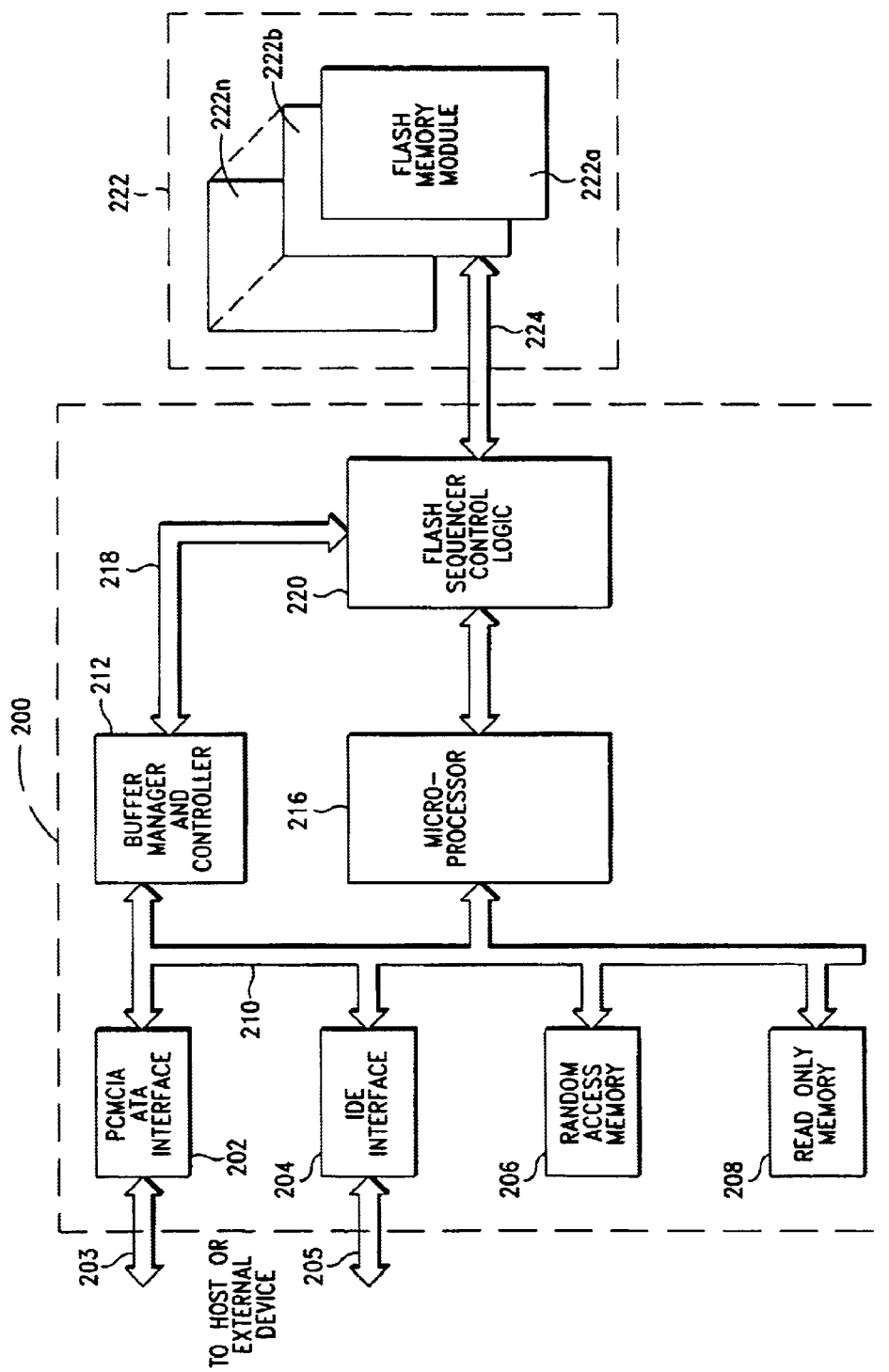
FIG. 2 is a block diagram illustrating the operative components of a compact flash controller in accordance with the present invention.

The invention will now be described with respect to FIG. 2, which illustrates the operative components of a compact flash controller 200 in accordance with the present invention. FIG. 2 shows flash memory 222 consisting of a plurality of NAND type flash memory modules 222a–222n is connected, via data bus 224, to compact flash controller 200 that manages all of the data transfer operation in and out of flash memory 222. For purposes of this embodiment compact flash memory controller 200 specifically directs data to be stored to a pair of flash memory modules 222a and 222b. Flash memory module 222a stores the odd data segment of a received data word while flash memory module 222b stores the remaining even bit data segment of the data word. Thus, a data word received from a host device is parsed into an add data segment that is written to and stored in flash memory module 222a and an even data segment is written to and stored in flash memory module 222b.

As FIG. 2 shows the compact flash controller 200 includes a PCMCIA-ATA interface 202, an IDE interface 204, random access memory 206, ROM memory 208 used for program storage, a buffer manager 212 and a microcontroller 216 that are interfaced to a high-speed data bus 210. Here, either the PCMCIA-ATA interface 202 or the IDE Interface 204 can transmit to or receive data, addresses and an array of control signals from a host or external device through either bidirectional data interface 203 or 205, respectively. For the purposes of this embodiment, data received from the host device is then transferred by the PCMCIA-ATA interface 202 across high-speed bus 210 to be stored in buffer manager and controller 212. Once the data word received from the PCMCIA-ATA interface 202, it is parsed into an even data segment and an add segment that is temporarily stored in buffer manager and controller 212.

FIG. 2 also shows that the buffer manager and controller 212 is directly connected via data interface 218 to flash sequencer control logic 220. Under program control, the microcontroller 216 directs buffer manager and controller 212 to sequentially move both the each data segment or sector through a FIFO like data register (first-in/first-out) of buffer manager and controller 212 and across the attached data interface 218 to the flash sequencer control logic 220. Upon receipt of the two data strings by flash sequencer control logic 220, an ECC error correction procedure is performed prior to being processed and written to flash memory 222. This allows errors, that would normally cause a problem, to be detected and corrected without effecting the operation of the system. Once the ECC error correction process is complete, flash sequencer control logic 220 then transfers the both odd and even data segments as well as the associated error correction code via data interface 224 to flash memory module 222a and flash memory module 222b, respectively.

When data is read from flash memory 222, the requested odd and even data segments are transferred from flash memory module 222a and flash memory module 222b, respectively, across data interface 224 to the flash sequencer control logic 220. The data segments are then moved to the buffer manager and controller 212 where they are concatenated into a complete data word that can be transferred back to the host either through the PCMCIA-ATA interface 202 or the IDE Interface 204.

FIG. 3 is a flowchart that illustrates the flow of events performed by the compact flash controller in accordance with FIG. 2. The steps in the flowchart are simply illustrative of the functional steps performed by the compact flash controller 200, however, a person of ordinary skill in the art will appreciate that the exact sequence of operation by the compact flash controller 200 to perform the functions described in the flowchart of FIG. 3 may vary. Reference is now to FIG. 3a of flowchart illustrating the steps performed by the compact flash controller to manage data transfers in and out of flash memory 222. As FIG. 3a shows at step 302, the card is inserted and detected, while at step 304 and 308 all components of the card including the compact flash controller 200, and flash memory 222 are powered up and initialized. At step 310, the controller determines which interface is to be used by detecting whether the OE/ATSEL is high (H) or at ground (L or GRD). If the received OE/ATSEL signal is high (H), the PCMCIA-ATA interface specification is selected.

Figure 3A:
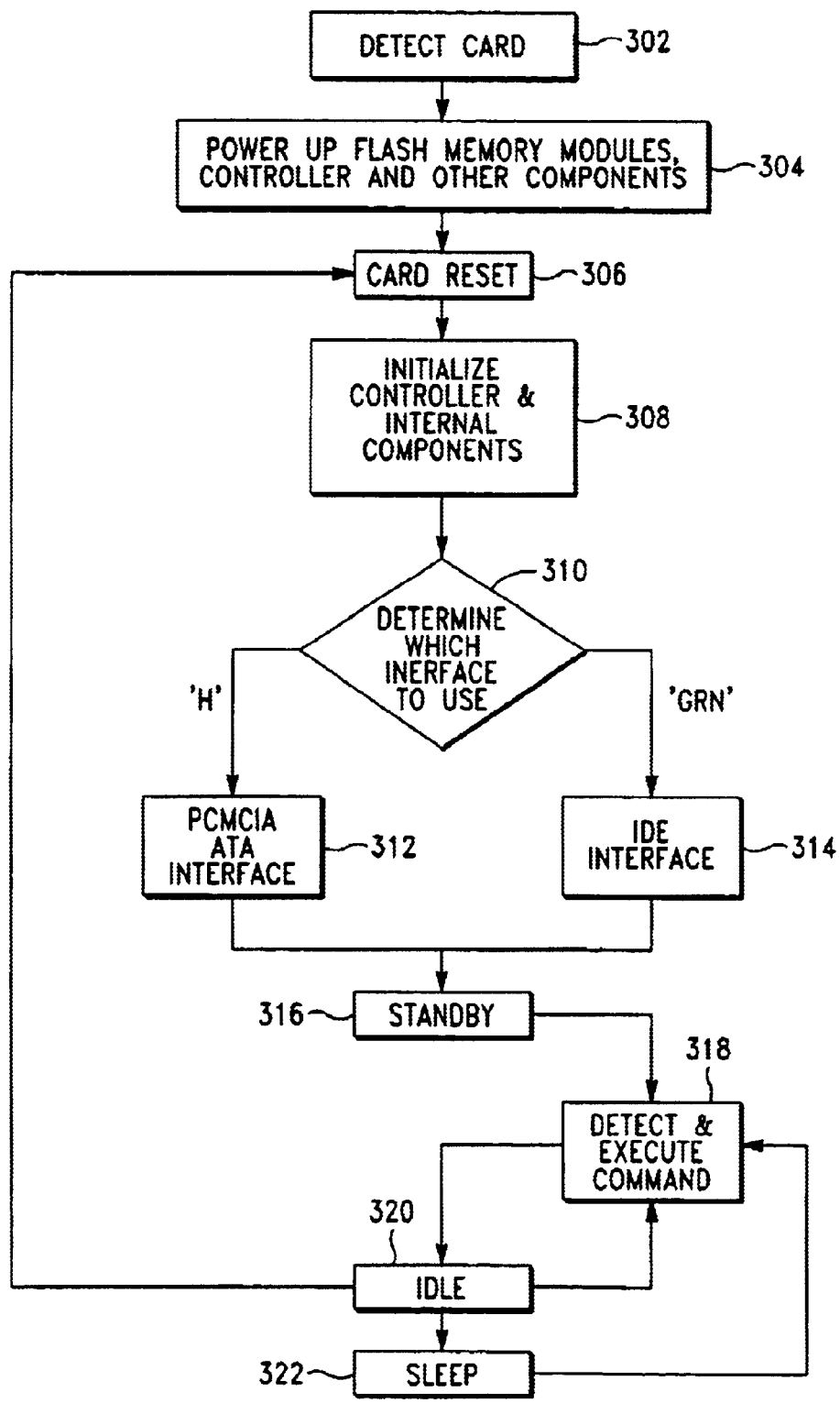
FIGS. 3a–3i are exemplary flow charts illustrating the flow of events performed by the compact flash controller in accordance with FIG. 2.
Figure 3B:
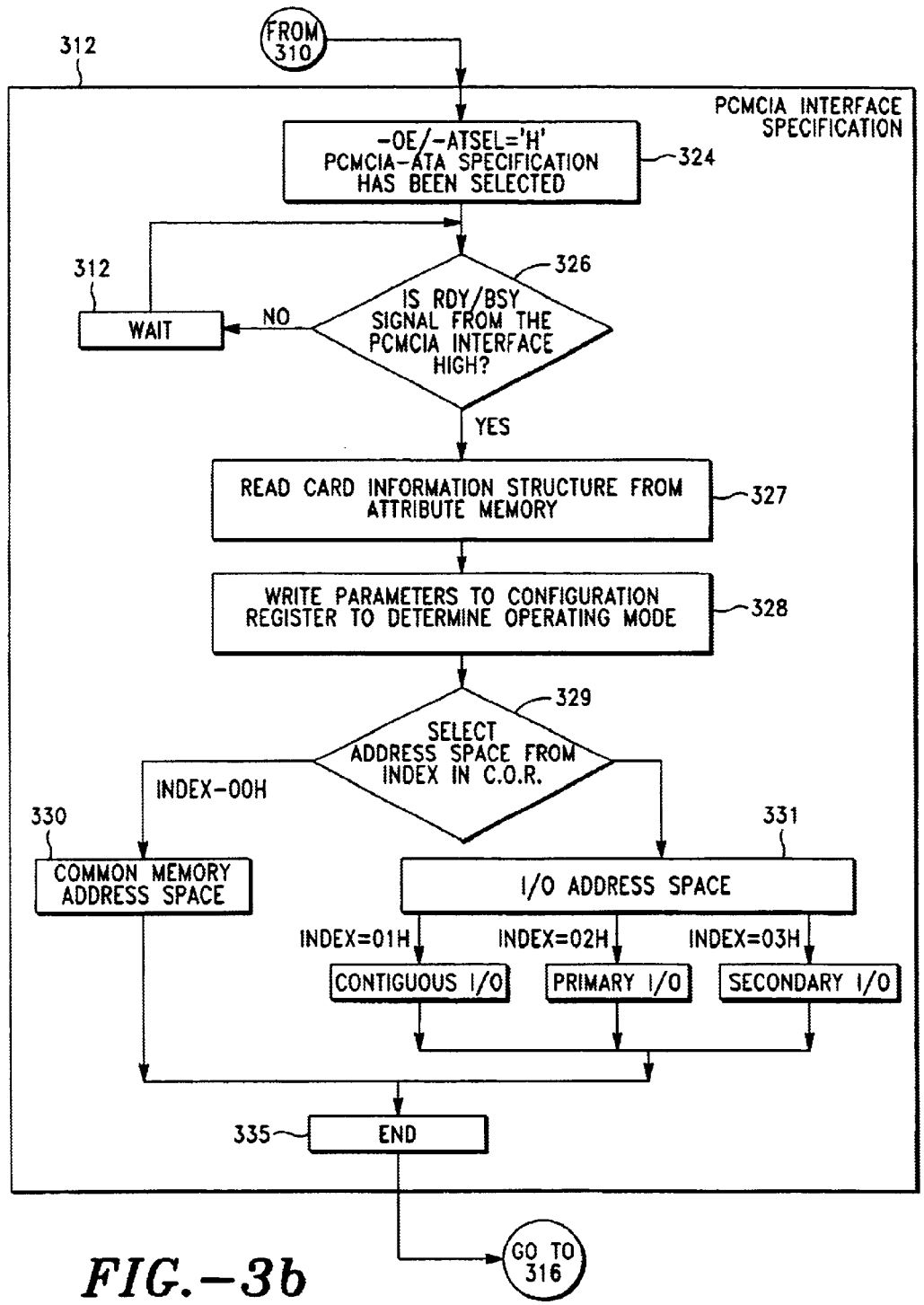

FIG. 3b is a flow chart that further details the steps used to configure the operative elements of compact flash controller including I/O memory space required to perform transfers of data, addresses and commands to and from the host device via the PCMCIA-ATA interface. As FIG. 3b shows, upon selection of the PCMCIA-ATA interface specification, if the detected ready/busy signal, in step 326, is low then the controller in step 325, waits until the ready/busy signal is high. When the ready/busy signal is detected as being high, at step 327, the configuration information structure register is read and in step 328, the parameters that determines the operational mode and configures the available memory space in accordance with a set of index parameters are written in the configuration option register. This determines the operation mode of the controller. At step 329, based on the index set forth in the configuration option register, an appropriate address space is then selected. As shown here, the address memory space that can be selected and configured, either singularly or in combination, is as common memory 330, contiguous I/O space 332, primary I/O space 333 or secondary I/O space 334. Once completed, at step 335, the process returns to step 316.

Figure 3C:
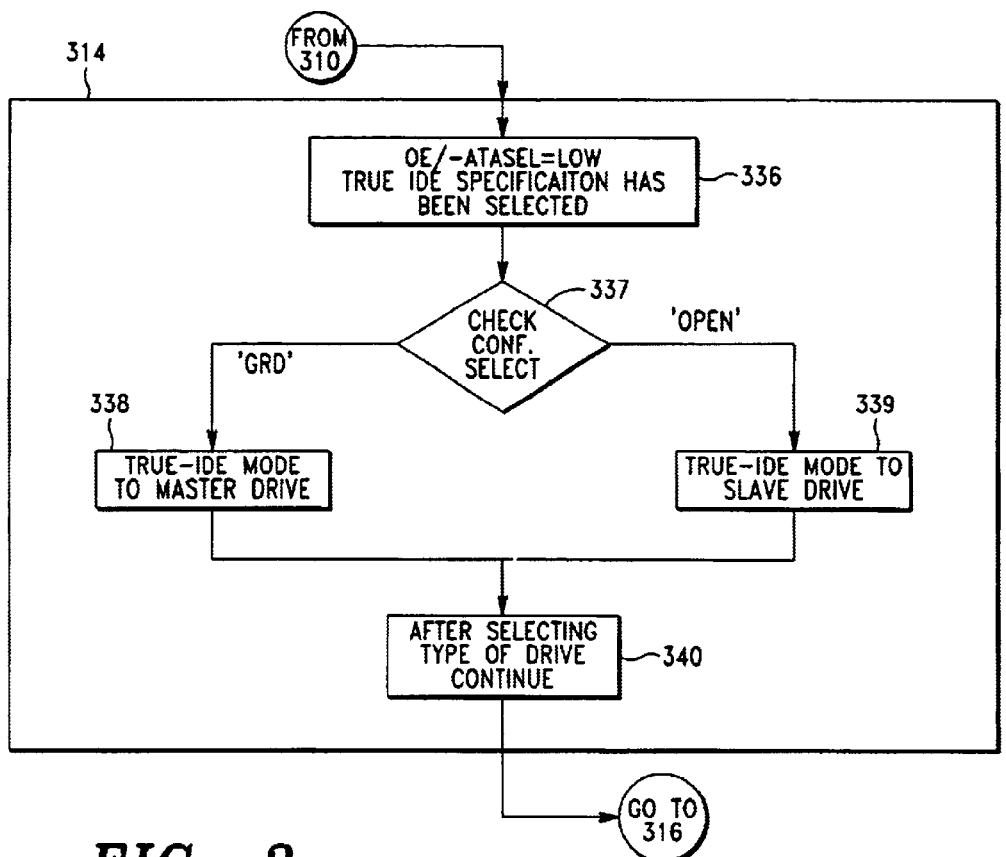

On the other hand, if the OE/ATSEL, at step 310 is low (L) or at ground (GND) then, at step 314, the IDE interface is selected. FIG. 3c shows a flow chart that further details step 314 used to configure the operative elements of the compact flash controller 200 required to perform transfers to and from the host device via the IDE interface specification. In this case, at step 337, the configuration or operational mode of the compact flash device is determined. If the received configuration signal is low or ground (GRD) then, at step 338, the operational mode of the compact flash device will appear and act as a "master drive" to the host device. But if the received configuration signal is 'open' or high then, at step 339, the compact flash device will appear and act as a "slave drive" to the host device.

Once the interface has been selected, micro-controller 216 at step 316, waits. When a "command in" signal is detected, at step 318, micro-controller 216 selects and performs the appropriate operative sequence that relates to that command. Once the command has been executed, micro-controller 216, at step 320, waits for either a software reset or to receive a command from the host or external device. If either the software reset or a new "command in" signal does not occur in a predetermined time period, micro-controller 216 in step 322, goes to sleep.

Figure 3D:
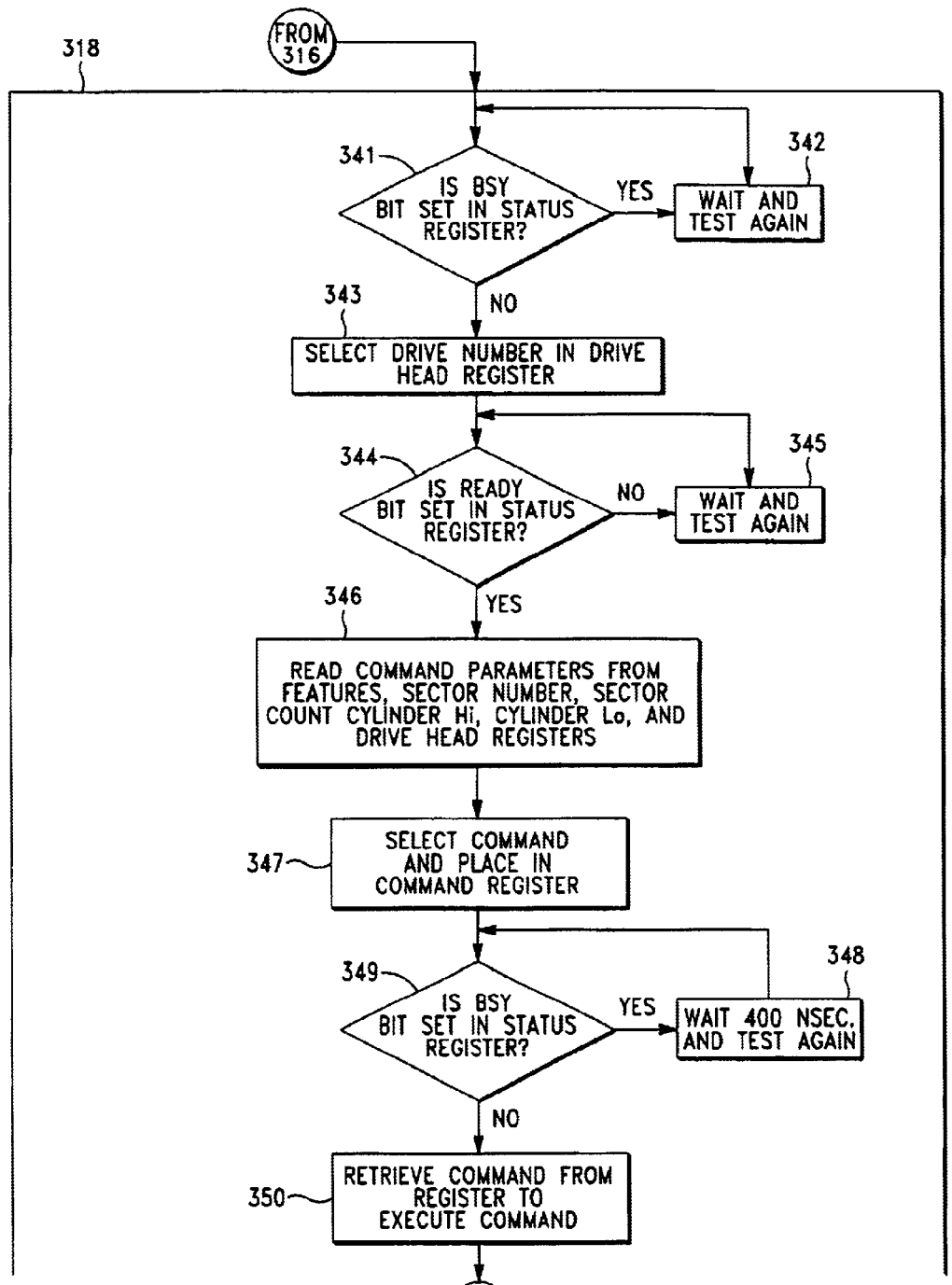
Figure 3E:
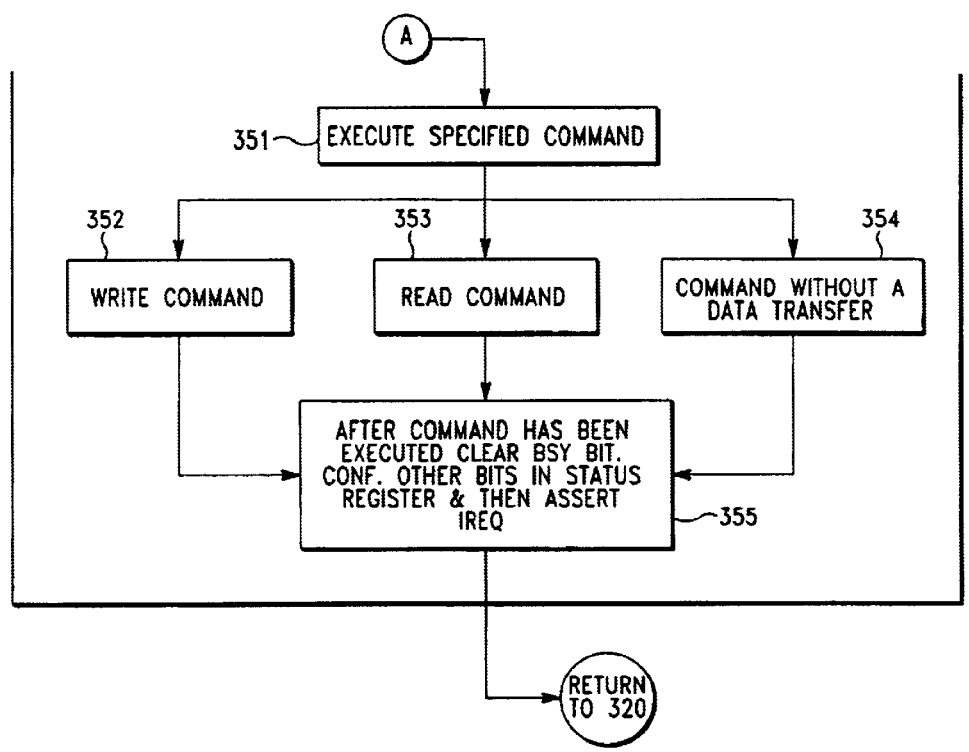

FIG. 3d is a detailed flow of event preformed by the compact flash controller 200 to execute the fundamental commands of transferring data or applications content in or out of flash memory 222. As shown, at step 341, compact flash controller 200 tests the busy bit (BSY) in the status register, if the busy bit (BSY) is set, micro-controller 216, at step 342, waits a specified period of time and tests the busy bit (BSY), once again, if the busy bit (BSY) is not set then, at step 343, the drive number is then retrieved from the drive head register. Compact flash controller 200, at step 344, tests the ready bit (RDY) in the status register. As before, if the ready bit (RDY) is set, the controller, at step 345, waits a specified period of time and tests the tests ready bit (RDY), once again. If ready bit (RDY) is not set then, at step 346, the related parameters command or operational elements of the requested command are read from the features, sector number, sector count, cylinder 'Hi', cylinder 'low' and drive head registers. Once these registers have been read, at step 347, compact flash controller 200 retrieves the appropriate command to be executed. FIG. 3e shows that compact flash controller 200 executes one of three types of command sequences; a write command, a read command or a command with no data transfer.

Figure 3F:
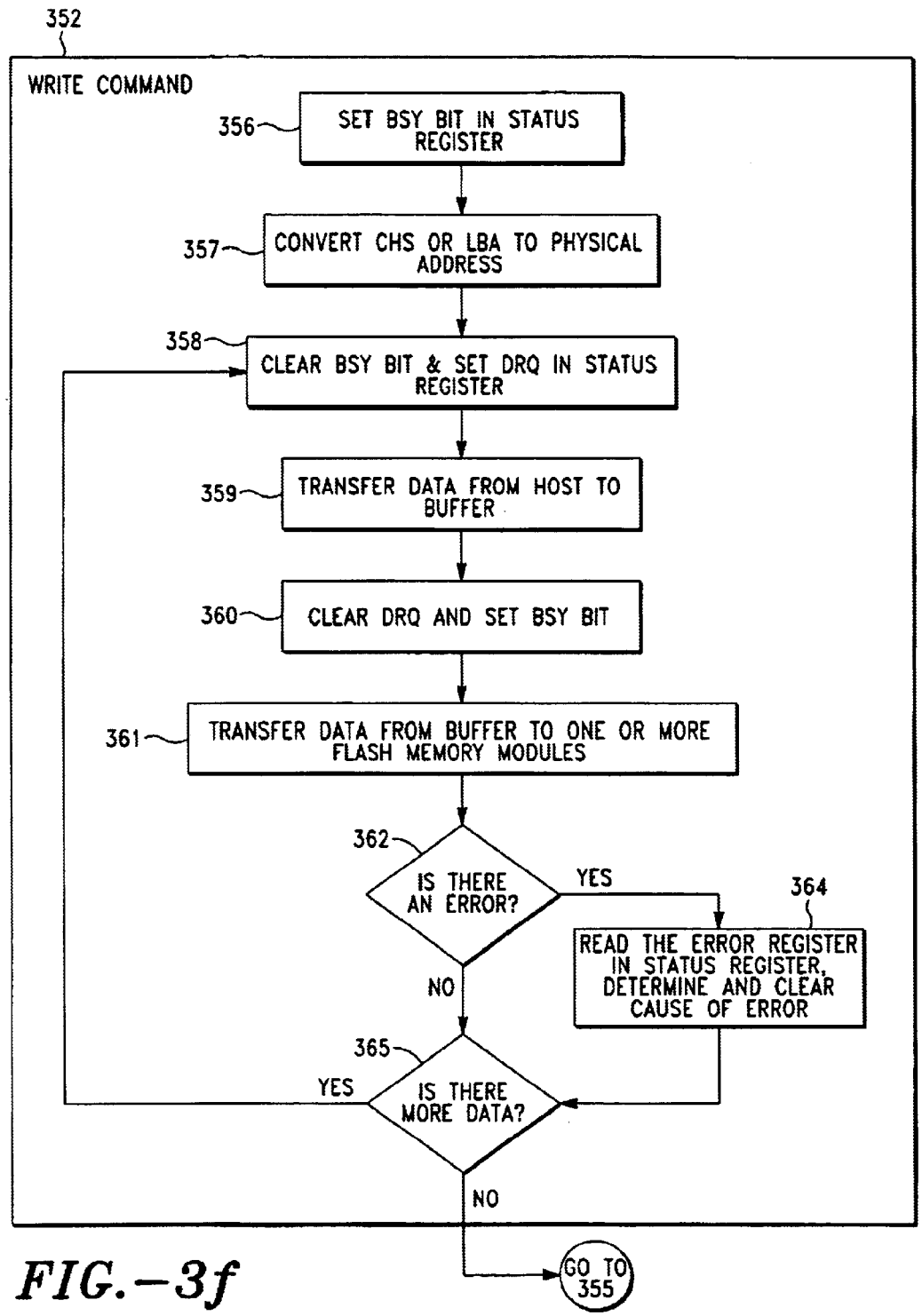

If a write command is specified, at step 351, then micro-controller 216, at step 352, writes data received from the host device to one or more of the flash memory modules. More precisely, FIG. 3f illustrates the operative elements of a write command that consist of, at step 358, clearing the busy bit (BSY) as well as setting the data reset query bit in the status register. Then, at step 359, a data segment or sector is written to the FIFO like data register. Compact flash controller 200, in step 360, then clears the DRQ bit and sets the busy bit (BSY) indicating that a data transfer is being executed. Micro-controller 216, in step 361, transfers the data segment or sector from the data register via flash sequencer control logic 220 and writes it to at least one flash memory module. If an error, at step 362, is detected, the error register, at step 364, is read to determine the cause of the error. If there is no error detected or the error has been corrected, micro-controller 216, at step 365, determines if there is additional data to be transferred. If so, at step 358, the busy bit (BSY) is cleared; the IREQ is asserted indicating that the write operation is not complete. Steps 358 to 365 are to be repeated until the controller has completed the data transfer. Once the transfer is complete, micro-controller 216, at step 355, clears the busy bit (BSY) and asserts the IREQ indicating that the write operation is complete. At step 320 (shown in FIG. 3e), the controller is then ready to execute the next "command in" received for the host device.

Figure 3G:
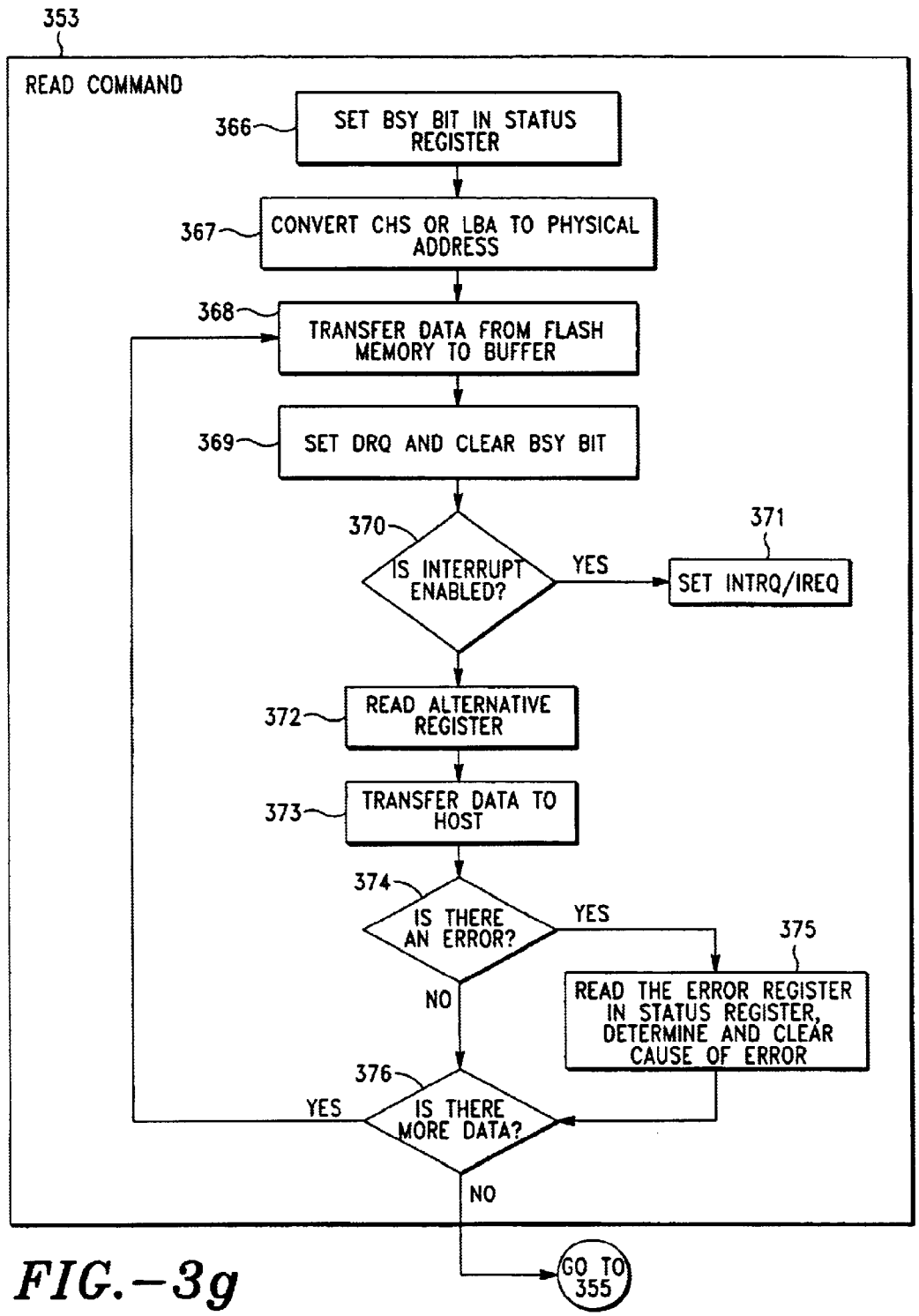

When a read command is specified, at step 351, then micro-controller 216, at step 353, reads data from one or more flash memory modules and transferring it through either the PCMCIA-ATA interface 202 or the IDE interface 204 to a connected host device. More precisely, FIG. 3g illustrates the operative elements of a read command that consist of at step 366, setting the busy bit (BSY) and clears the data reset query bit in the status register. The physical address, where a data segment or sector can be found upon transfer, is derived, at step 367, from either the CHS or LBA found in the device/head register. The data segment or sector, in step 368, is then read from flash memory and placed in the buffer.

Figure 3H:
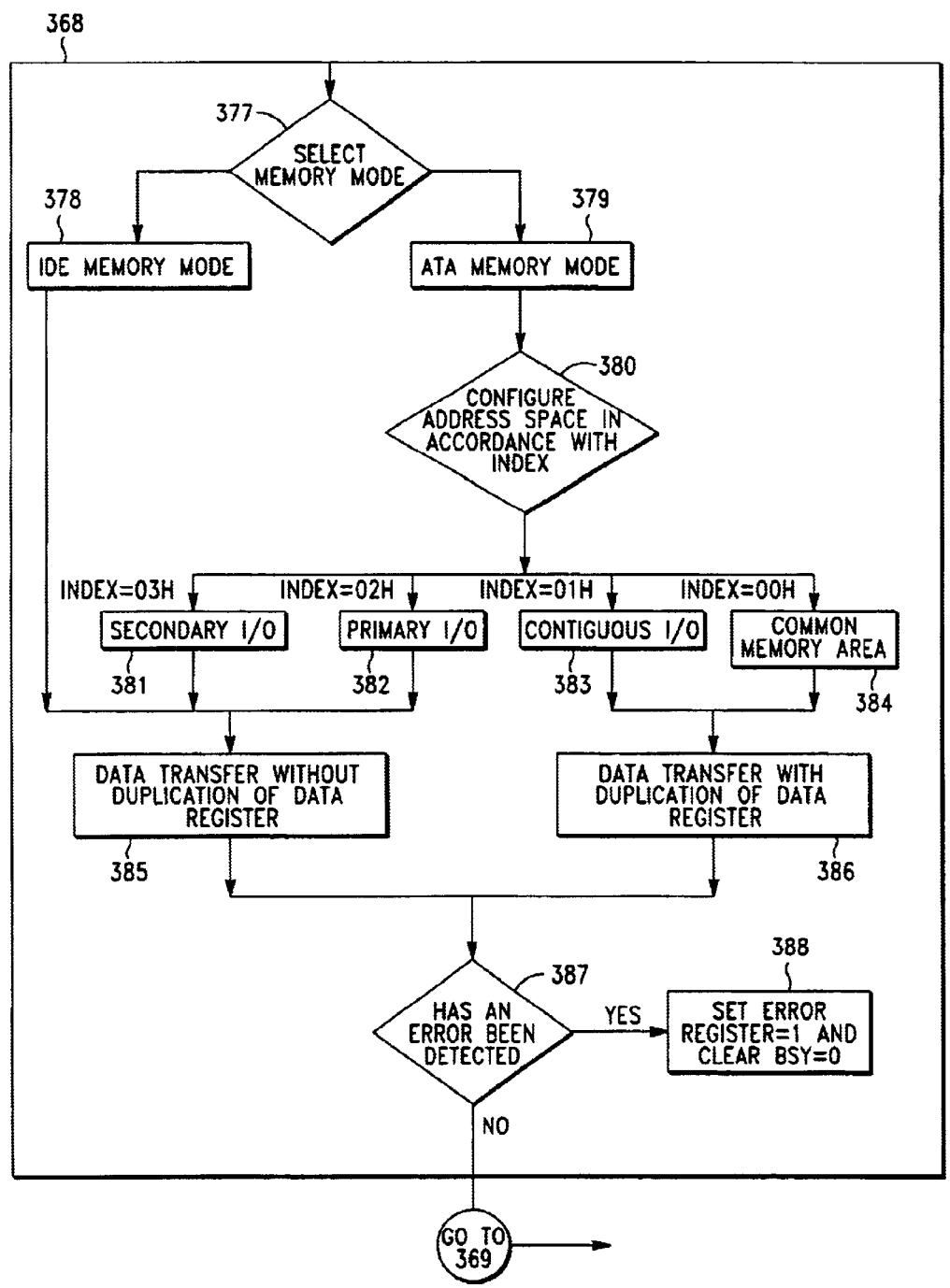
Figure 3I:
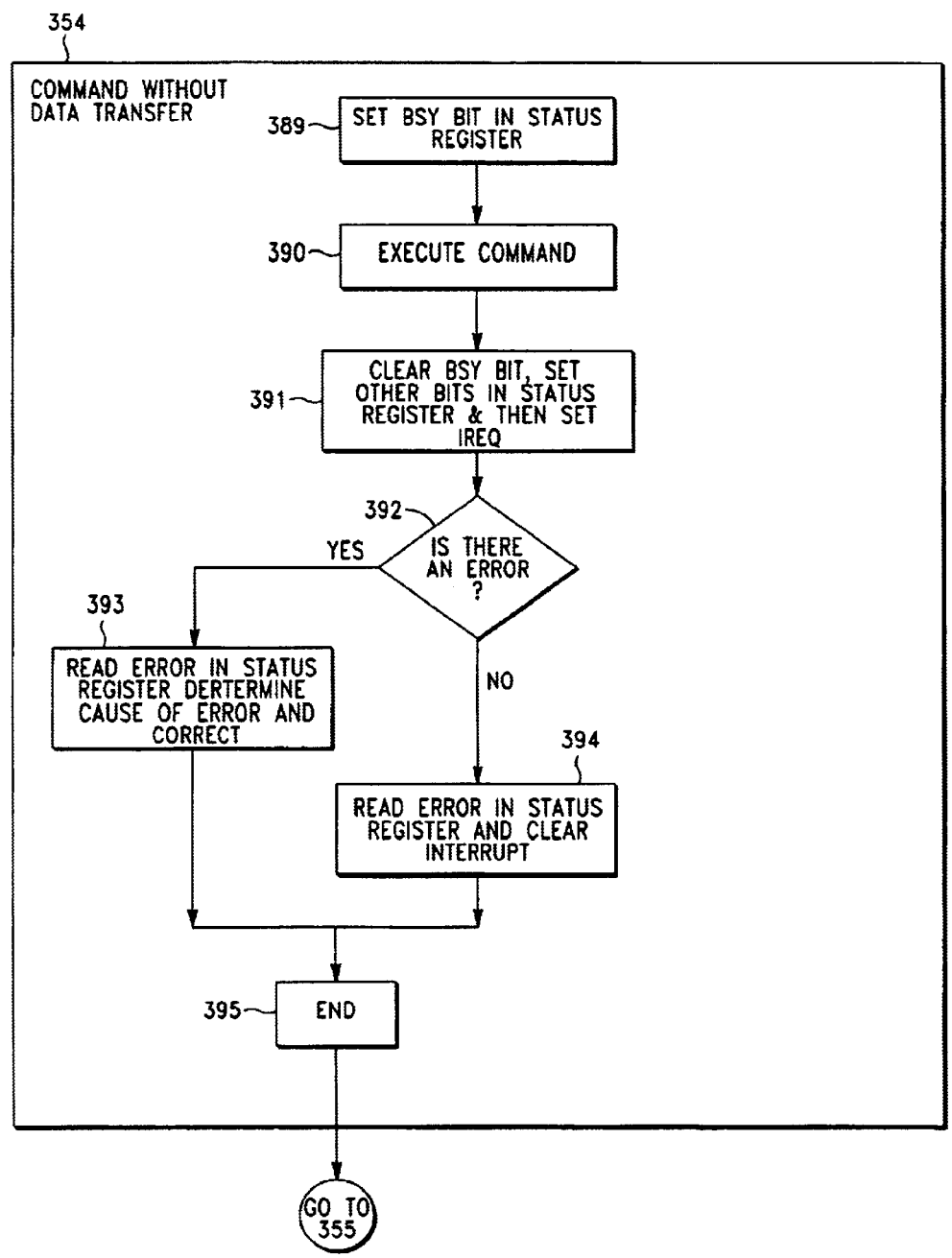

More precisely, FIG. 3h depicts the detailed steps of transferring data from one or more flash memory modules that consists of, at step 377 selecting a memory mode. If the IDE mode 378 is selected, micro-controller 216, at step 385, performs a data transfer without duplicating the date segment in a data register. If there is an error detected, at step 387, then, at step 388, the error bit in the error register is set to one (1) and the busy bit in the status register is cleared. But if there is no error detected, at step 387, then the data transfer continue until completion. On the other hand, If ATA memory mode 379 is chosen, the address space, at step 380 is configured to either be primary I/O space 381, secondary I/O space 382, contiguous I/O space 383 or common memory 384. Thus, if the address is configured as primary I/O space 381 or secondary I/O space 382, the data transfer, at step 385, is performed without duplicating the data segment to the FIFO like data register. For those data transfers via either contiguous I/O or common memory space, the data transfer, at step 386, is performed with duplicating the data segment to the FIFO like data register. As described previously, if an is error detected, at step 387, the error bit, at step 386 is set to one (1) in the error register and the busy bit in the status register is cleared. If an error is not detected, at step 387, then the data transfer continues until it is complete.

Returning is now made to FIG. 3g, once the data transfer from flash memory to buffer manager and controller 212 is complete, micro-controller 216, at step 369, sets the DRQ and clears the busy bit (BSY). Then, at step 370, micro-controller 216 checks for an interrupt. If the interrupt has been enabled, micro-controller 216, at step 371, sets the INTRQ/IREQ and transfers, at step 373, the data via the PCMCIA-ATA interface 202 to the host device. If an interrupt is not enabled, micro-controller 216, at step 372, reads an alternative register that dictates the method of data transfer. After reading the parameters in the alternative register, micro-controller 216, at step 373, performs the prescribed data transfer. As described previously, if an error is detected, the error register, at step 374, is read to determine the cause of the error. If there is no error detected or the error has been corrected, micro-controller 216, at step 375, determines if there is additional data to be transferred. If so, at step 358, the busy bit (BSY) is cleared; the REQ is asserted indicating that the write operation is not complete. Steps 368 to 376, FIG. 3g, are to be repeated until micro-controller 216 has completed the data transfer. Once the transfer is complete, micro-controller 216, at step 355, continues on to clears the busy bit (BSY) and asserts the IREQ indicating that the write operation is complete. At step 320 (shown in FIG. 3a), micro-controller 216 is then ready to execute the next "command in" received for the host device.

The third command shown in FIG. 3e is the command that does not include a data transfer. Thus, if, at step 351, a command with no data transfer is detected by the controller, in step 389, FIG. 3i, sets the busy bit (BSY) in the status register and then, in step 390, micro-controller 216 executes the command. Once completed, the compact flash controller, in step 391, then clears the busy bit (BSY) and determines if there is an error, step 392 and if no error, step 394, clears the interrupt and ends the command without data transfer, step 394. If there is an error, the error is corrected, step 393 before the end of the command without data transfer. At the end, step 395, micro-controller 216 sets other bits in status register, step 55, FIG. 3e, indicating it has executed the command and in step 320 (shown in FIG. 3a), is standing for the next "command in" operation. Thus, if micro-controller 216 is idle, at step 320, for more than a half a second, micro-controller 216 becomes dormant and goes to "sleep" while waiting for the next command.

While the foregoing detailed description has described several embodiments of the compact flash controller in accordance with this invention, it is to be understood that the above description is illustrative only and not limiting of the disclosed invention. Particularly, used in a compact flash memory card, the compact flash controller automatically detects which operational mode is used for the attached interface device and configures the memory card to perform the necessary data transfers in accordance with that operation mode. Thus, the compact flash controller allows the memory card to operate in either the PCMCIA mode, or the ATE IDE mode. These operating modes are merely exemplary. The compact flash controller can be configured to automatically detect and operate in additional operating modes and with additional interfaces. It will be appreciated that the embodiments discussed above and the virtually infinite embodiments that are not mentioned could easily be within the scope and spirit of this invention. Therefore, the invention is to be limited only by the claims as set forth below.

What is claimed is:

1. A method of controlling the transfer of data between flash memory and a host device performed by a compact flash controller comprising the steps of:
   receiving power up sequence from host device;
   detecting presence of a card containing a plurality of flash memory components;
   initializing controller, a plurality of flash memory modules as well as other internal components;
   receiving an incoming OE/ATSEL signal;
   determining which interface specification is to be used for to transfer data, address information and control signals to and from the host device;
   configuring structure of the flash memory in accordance to the parameters of the configuration information table stored in a read-only memory of the compact flash controller;
   detecting that there is a command to be processed;
   selecting the command specified by a plurality of command parameters from at least one register found in an attribute memory of the compact flash controller; and
   executing the command.

2. The method as recited in claim 1, wherein if the received state of the OE/ATSEI signal is high then a PCMCIA/ATA interface is selected to receive as well as transfer of data, address information between flash memory and a host device.

3. The method as recited in claim 1, wherein if the received state of the OE/ATSEI signal is low then a true IDE interface is selected to receive as well as transfer of data, address information between flash memory and a host device.

4. The method as recited in claim 1, wherein the command specified by the plurality of command parameters retrieved from a set of program registers, writes data and address content received from the host device to at least one odd bit partition and at least one even bit partition of flash memory.

5. The method as recited in claim 1, wherein the command specified by the plurality of command parameters retrieved from a set of program registers, reads data and address content from at least one odd bit partition and at least one even bit partition of flash memory that Is transferred back to the host device.

6. The method as recited in claim 1, wherein the command specified by the plurality of command parameters retrieved from a set of program registers is a command that controls the operation of the compact flash but does not perform a data transfer between the host device and the flash memory.

7. The method as recited in claim 1, wherein after the compact flash controller has executed the specified command, the compact flash controller stands idle waiting a predetermined time period for the next command to execute.

8. The method as recited in claim 1, wherein after if the a predetermined time period elapses, the compact flash controller suspends any operative activity and waits until a request to execute a new command has been detected.

9. A system for controlling the transfer of data between flash memory and a host device comprising:
   circuitry of the compact flash controller configured to receive receiving power up sequence from host device;
   circuitry of the compact flash controller configured to detect presence of a card containing a plurality of flash memory components;
   circuitry of the compact flash controller configured to initialize controller, a plurality of flash memory modules as well as other internal components;
   circuitry of the compact flash controller configured to receive an incoming OE/ATSEL signal;
   circuitry of the compact flash controller configured to determine which interface specification is to be used for to transfer data, address information and control signals to and from the host device;

circuitry of the compact flash controller configured to configure structure of the flash memory in accordance to the parameters of the configuration information table stored in a read-only memory of the compact flash controller;

circuitry of the compact flash controller configured to detect that them is a command to be processed;

circuitry of the compact flash controller configured to select the command specified by a plurality of command parameters from at least one register found in an attribute memory of the compact flash controller; and circuitry of the compact flash controller configured to execute the command.

10. The system as recited in claim 9, wherein the circuitry of the compact flash controller initiates PCMCIA/ATA interface is selected to receive as well as transfer of data, address information between flash memory and a host device, if the received state of the OE/ATSEI signal is high.

11. The apparatus as recited in claim 9, wherein the circuitry of the compact flash controller initiates IDE interface is selected to receive as well as transfer of data, address information between flash memory and a host device, if the received state of the OE/ATSEI signal is low.

12. The apparatus as recited in claim 9, wherein the circuitry of the compact flash controller initiates a writes data and address content received from the host device to at least one odd bit partition and at least one even bit partition of flash memory, if the command has been specified by the plurality of command parameters retrieved from a set of program registers.

13. The apparatus as recited in claim 9, wherein the circuitry of the compact flash controller initiates a read data and address content received from the at least one odd bit partition and at least one even bit partition of flash memory to a host device, if the command has been specified by the plurality of command parameters retrieved from a set of program registers.

14. The apparatus as recited in claim 9, wherein the circuitry of the compact flash controller initiates a command that controls the operation of the compact flash but does not perform a data transfer between the host device and the flash memory, if the command has been specified by the plurality of command parameters retrieved from a set of program registers.

15. The apparatus as recited in claim 9, wherein the circuitry of the compact flash controller stands idle waiting a predetermined time period for the next command to execute.

16. The apparatus as recited in claim 15, wherein the circuitry of the compact flash controller suspends any operative activity and waits until a request to execute a new command has been detected, if the a predetermined time period elapses.

17. A computer program product that includes a computer useable medium having computer readable code embodied therein controlling the transfer of data between flash memory and a host device, the computer program product comprising:

a computer readable program code devices of the compact flash controller configured to receive receiving power up sequence from host device;

a computer readable program code devices of the compact flash controller configured to detect presence of a card containing a plurality of flash memory components;

a computer readable program code devices of the compact flash controller configured to initialize controller, a plurality of flash memory modules as well as other internal components;

a computer readable program code devices of the compact flash controller configured to receive an incoming OE/ATSEL signal;

a computer readable program code devices of the compact flash controller configured to determine which interface specification is to be used for to transfer data, address information and control signals to and from the host device;

a computer readable program code devices of the compact flash controller configured to configure structure of the flash memory in accordance to the parameters of the configuration information table stored in a read-only memory of the compact flash controller;

a computer readable program code devices of the compact flash controller configured to detect that there is a command to be processed;

a computer readable program code devices of the compact flash controller configured to select the command specified by a plurality of command parameters from at least one register found in an attribute memory of the compact flash controller; and a computer readable program code devices of the compact flash controller configured to execute the command.

18. The computer program product as recited in claim 17, wherein if the received state of the OE/ATSEI signal is high then the computer readable program code devices of the compact flash controller initiates a PCMCIA/ATA interface is selected to receive as well as transfer of data, address information between flesh memory and a host device.

19. The computer program product as recited in claim 17, wherein if the received state of the OE/ATSEI signal is low then the computer readable program code devices of the compact flesh controller initiates a true IDE interface is selected to receive as well as transfer of data, address information between flash memory and a host device.

20. The computer program product as recited in claim 17, wherein the command specified by the plurality of command parameters the computer readable program code devices of the compact flash controller writes data and address content received from the host device to at least one odd bit partition and at least one even bit partition of flash memory.

21. The computer program product as recited in claim 17, wherein the command specified by the plurality of command parameters the computer readable program code devices of the compact flash controller reads data and address content from at least one odd bit partition and at least one even bit partition of flash memory that is transferred back to the host device.

22. The computer program product as recited in claim 17, wherein the command specified by the plurality of command parameters the computer readable program code devices of the compact flash controller initiates a command that controls the operation of the compact flash but does not perform a data transfer between the host device and the flash memory.

23. The computer program product as recited in claim 17, the computer readable program code devices of the compact flash has executed the specified command, the compact flash controller stands idle waiting a predetermined time period for the next command to execute.

24. The computer program product as recited in claim 17, wherein if after a predetermined time period elapses the computer readable program code devices of the compact flash suspends any operative activity and waits until a request to execute a new command is detected.

25. A method of controlling the transfer of data between flash memory and a host device performed by a compact flash controller comprising the steps of:

receiving power up sequence from host device;

detecting presence of a card containing a plurality of flash memory components;

initializing the controller, the flash memory modules and other internal components;

receiving PCMCIA and IDE interface signals;

determining an interface specification to be used to transfer data, address information and control signals to and from the host device by the controller in accordance with a received PCMCIA and IDE interface signal;

configuring the flash memory in accordance with an operational mode determined the determined interface specification parameters of a configuration information table stored in a read-only memory of the controller, detecting that there is a command to be processed;

selecting the command specified by a plurality of command parameters from at least one register found in an attribute memory of the compact flash controller; and executing the command in accordance with the received interface signal.

* * * * *